（12） United States Patent
Saeedi et al.

(10) Patent No.: US 8,896,440 B2
(45) Date of Patent: Nov. 25, 2014

(54) EVENT-TRIGGERED DYNAMIC LANDMARK CREATION SYSTEM AND METHOD

(75) Inventors: Fara Saeedi, North Vancouver (CA); Rami Jebara, Vancouver (CA); Scott Venn, Burnaby (CA)

(73) Assignee: Webtech Wireless Inc., Burnaby (CA)

( * ) Notice: Subject to any disclaimer, the term of this patent is extended or adjusted under 35 U.S.C. 154(b) by 428 days.

(21) Appl. No.: 13/480,398

(22) Filed: May 24, 2012

(65) Prior Publication Data

US 2013/0316724 A1 Nov. 28, 2013

(51) Int. Cl.
*G08B 1/08* (2006.01)
(52) U.S. Cl.
USPC .................................................... 340/539.13
(58) Field of Classification Search
USPC .......... 340/539.13, 988, 995.24, 994, 426.19, 340/573.1; 455/456.1
See application file for complete search history.

(56) References Cited

U.S. PATENT DOCUMENTS

| | | | |
|---|---|---|---|
| 7,263,437 B2* | 8/2007 | Hirose et al. | 701/517 |
| 7,538,667 B2* | 5/2009 | Koen | 340/539.13 |
| 8,655,375 B2* | 2/2014 | Aceves et al. | 455/456.1 |
| 2006/0040676 A1* | 2/2006 | Chen | 455/456.1 |
| 2012/0130632 A1* | 5/2012 | Bandyopadhyay et al. | 701/446 |

* cited by examiner

*Primary Examiner* — Phung Nguyen
(74) *Attorney, Agent, or Firm* — John R. Flanagan

(57) ABSTRACT

An event-triggered dynamic landmark creation system includes a management system and tracking devices attached to mobile objects. Each tracking device is configured to wirelessly transmit information pertaining to current time, identification and location of tracking devices, and status of mobile objects. The management system is configured to wirelessly communicate with each tracking device and is operable: to receive information transmitted from each tracking device; in response to occurrence of an initial event respecting status of a first mobile object, to create a nonphysical dynamic landmark about the first mobile object relative to location of a first tracking device attached thereto; and in response to occurrence of successive subsequent events respecting location of a second tracking device attached to a second mobile object, to record a visit of the second mobile object within the dynamic landmark about the location of the first mobile.

20 Claims, 4 Drawing Sheets

EVENT-TRIGGERED DYNAMIC LANDMARK CREATION SYSTEM AND METHOD

TECHNICAL FIELD

The subject matter of the present invention relates to the field of wireless asset tracking and fleet operations management and, more particularly, is concerned with an event-triggered dynamic landmark creation system and method.

BACKGROUND ART

Fleet operations managements need to monitor the typical daily activities of their service supervisors. An example of such organization is a utility company. The various prevailing circumstances that complicate meeting this need include the fact that the locations of the job sites regularly change and the information about these locations may not be available ahead of time. Thus, it is not possible to set up desired landmarks for the job sites ahead of time.

Consequently, an innovation is desired that will adapt a fleet management system to cost-effectively provide a co-location report that will cover supervisor visits and time spent with work crews at certain job sites.

SUMMARY OF THE INVENTION

The subject matter of the present invention provides such an innovation cost effectively by reducing the computational resources needed to calculate metrics around supervisor visit events and thereby the anticipated administrative cost of managing and extracting this type of report from the fleet management system.

One aspect of the present invention is an event-triggered dynamic landmark creation system which includes a plurality of tracking devices and a management system. Each of the tracking devices is attached to one of a plurality of mobile objects and configured to wirelessly transmit information pertaining to the current time, the identification and location of the tracking device, and the status of the mobile object to which the tracking device is attached. The management system is configured to wirelessly communicate with each of the tracking devices and is operable: to receive the information from each of the tracking devices; in response to the received information concerning the occurrence of an initial event with respect to the status of a first of the mobile objects, create a non-physical dynamic landmark about the first mobile object relative to the location of a first of tracking devices attached thereto; and in response to the received information concerning the occurrence of successive subsequent events with respect to the location of a second of the tracking devices attached to a second of the mobile objects, record a visit of the second mobile object within the dynamic landmark about the location of the first mobile.

Another aspect of the present invention is an event-triggered dynamic landmark creation method which includes: wirelessly transmitting information pertaining to the current time, the identification and location of each of a plurality of tracking devices attached to one of a plurality of mobile objects, and the status of the mobile object to which one of the tracking devices is attached; wirelessly receiving at a management system the information from each of the tracking devices; in response to the received information concerning the occurrence of an initial event with respect to the status of a first of the mobile objects, creating a non-physical dynamic landmark about the first mobile object relative to the location of a first of tracking devices attached thereto; and in response to the received information concerning the occurrence of successive subsequent events with respect to the location of a second of the tracking devices attached to a second of the mobile objects, recording a visit of the second mobile object within the dynamic landmark about the location of the first mobile object.

BRIEF DESCRIPTION OF THE DRAWINGS

For clarity, the drawings herein are not necessarily to scale, and have been provided as such in order to illustrate the principles of the subject matter, not to limit the present invention.

DESCRIPTION OF EMBODIMENTS

Figure 1:
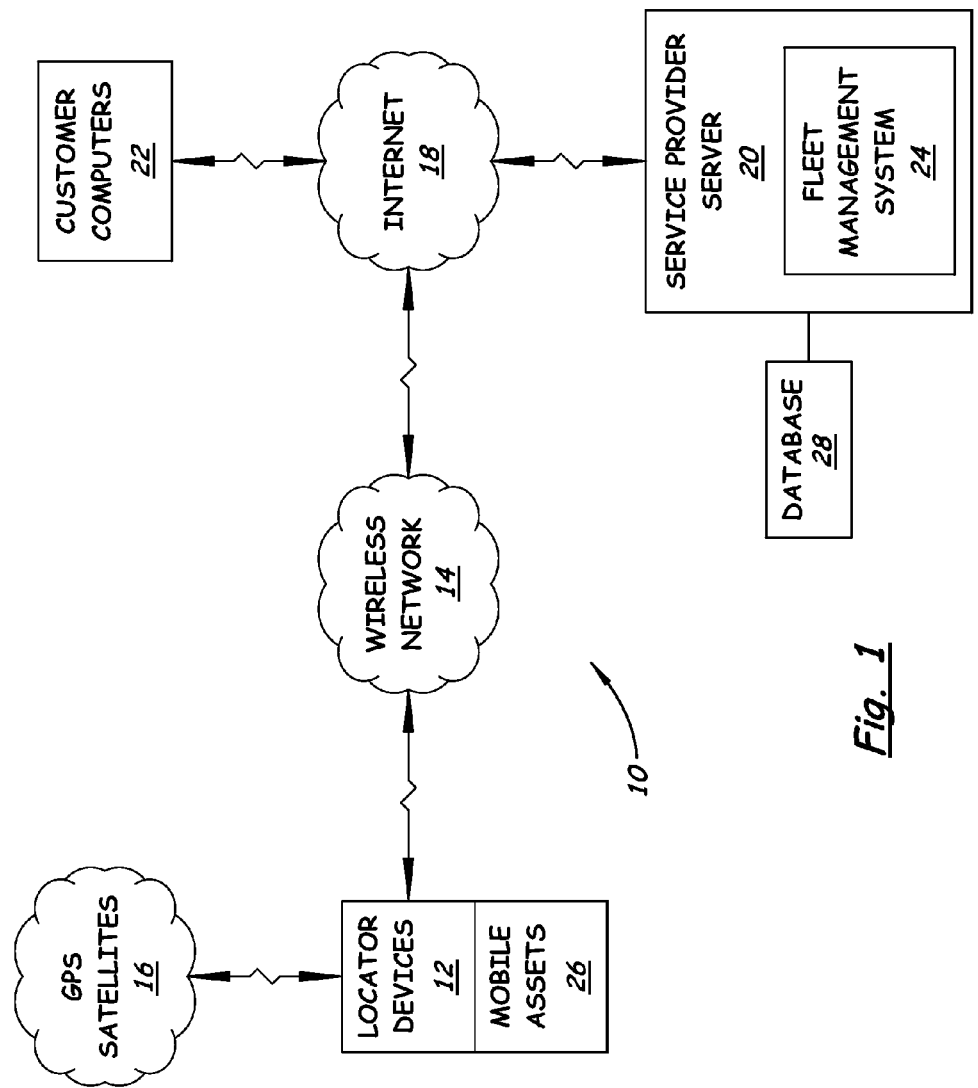
FIG. 1 is a block diagram of a wireless communication system incorporating a fleet management system that is adaptable to operate in accordance with an event-triggered dynamic landmark creation system and method of the present invention.

Referring now to FIG. 1, there is shown a wireless communication system 10 which includes a plurality of locator devices 12, a wireless network 14, a plurality of GPS satellites 16, the Internet 18, a service provider server 20, and a plurality of customer or subscriber computers 22. A fleet management system 24 is installed in the service provider server 20 to wirelessly communicate with the locator devices 10 via the wireless network 14 and the Internet 18. The fleet management system 24 provides portal-based locator device management functions, such as device monitoring, tracking and reporting to just name a few, to serve various subscriber needs. Each locator device 12, which in a more generic sense is any wireless network enabled tracking device, is installed in one of a plurality of mobile assets 26 to be tracked, which in a more generic sense is any plurality of mobile objects. Each locator device 12 is operable to obtain information from the GPS satellites 16 identifying its GPS position and provide real-time reporting of the position information and status of the mobile asset 26 to the fleet management system 24. The fleet management system 24 in the server 20 is adapted to operate in accordance with an event-triggered dynamic landmark creation system and method of the present invention which will be described in detail hereafter. The wireless network 14 and the Internet 18 enable wireless communication of information between the locator devices 12 and the fleet management system 24 of the server 20. The subscriber computers 22 access and utilize various ones of the management functions of the fleet management system 24 that can meet their specified needs. More particularly, a database 28 is coupled to the server 20 to store data that is made available to and used by the fleet management system 24 in accordance with the system and method of the present invention in performing the functions that serve the specified needs of the various subscribers. U.S. Pat. No. 7,538,667 assigned to WebTech Wireless Inc. describes in detail the operation of the wireless communication system 10, the locator devices 12 and the fleet management system 24 prior to its operation in accordance with the event-triggered dynamic landmark creation system and method of the present invention. The disclosure of this patent is hereby incorporated herein by reference.

Figure 2:
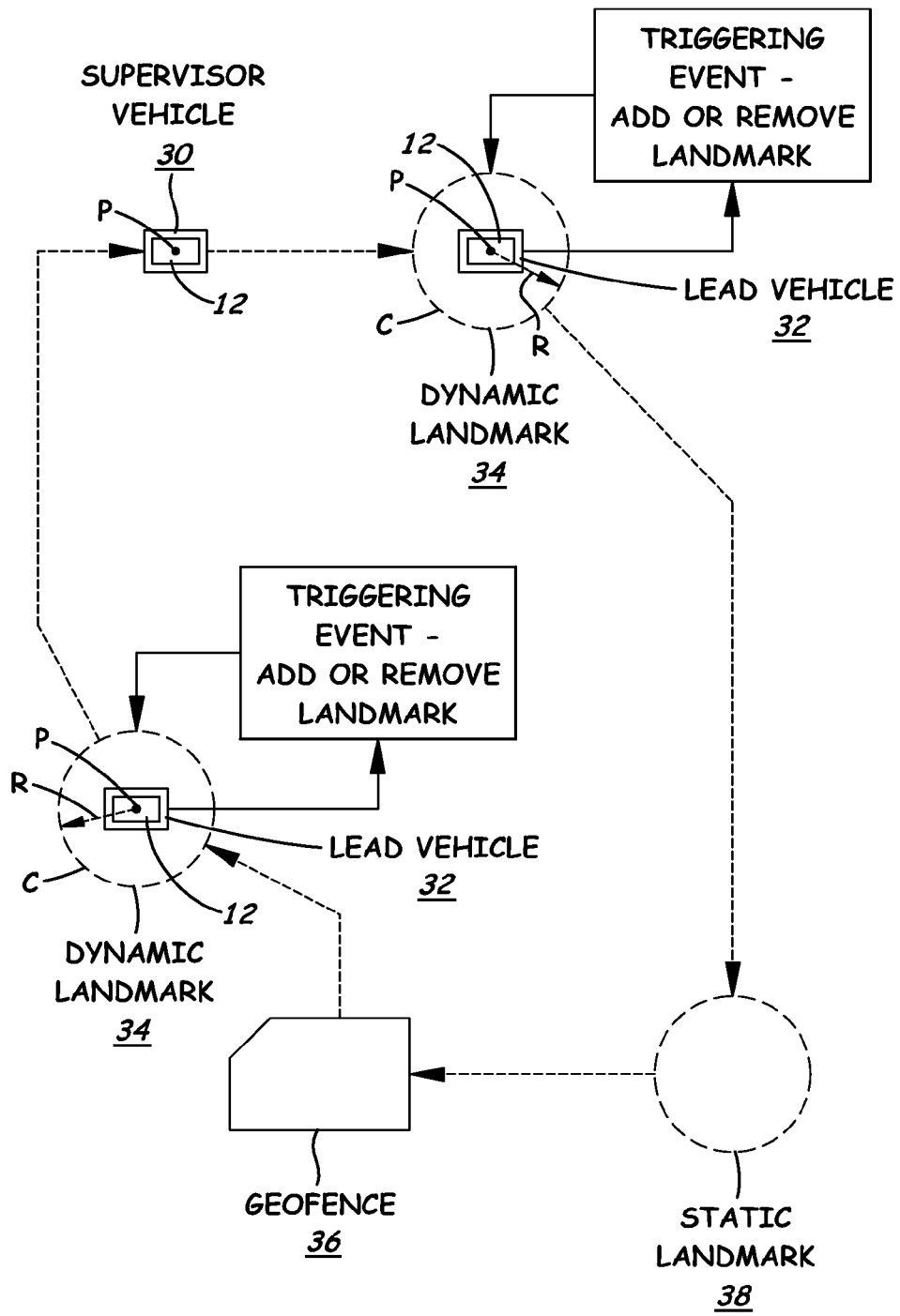
FIG. 2 is a flow diagram of a simplified illustrative example of supervisor vehicle movement and locations of locator devices in lead vehicles defining dynamic landmarks at job sites visited by the supervisor vehicle with respect to which a co-location report is generated in accordance with the system and method of the present invention.

Turning now to FIG. 2, there is illustrated an simplified diagram of a mobile object or asset in the form of a supervisor vehicle 30 moving between various job sites where mobile objects or assets in the form of lead (or anchor) vehicles 32 of work crews are located performing assigned tasks. The supervisor vehicle 30 is to make a visit and spend time at each of the job sites as part of the performance of supervisory duties with respect to the work being carried out there. A co-location report is generated in accordance with the event-triggered dynamic landmark creation system and method of the present invention to provide the desired documentation of the time of the visit of the supervisor vehicle 30 with respect to the job sites. Each of the locator devices 12 installed in the supervisor and lead vehicles 30, 32 has a unique ID recognized by the fleet management system 24 such that a special attribute may be assigned to each of the vehicles 30, 32 to distinguish them from one another. Further, each uniquely-identified locator device 12 is configured to automatically transmit to the system 24 the current time and location and other status information of the vehicle 30, 32 to which the locator device 12 is assigned and physically attached. In accordance with the system and method of the present invention, the fleet management system 24 is operable to set up a non-physical dynamic landmark 34, as shown graphically in FIG. 2, in the server 20 and/or database 28, upon the happening of a pre-defined event. One example of such pre-defined event is the turn-off of the ignition of one of the lead vehicles 32. The locator device 12 of the one lead vehicle 32 detects shut off of its ignition and reports that event to the fleet management system 24. The system 24 is informed only of the occurrence of the pre-defined event and not that it actually occurred at a job site. The underlying assumption here is that the reason the ignition was shut off is that the one lead vehicle 32 has stopped at a job site. The dynamic landmark 34 set up in the server 20 and/or database 28 by the system 24 is configured as a circular boundary C surrounding the respective job site. The circular boundary C has a given pre-defined radius R, which by way of example but not limitation may measure from 50 to 100 feet, extending from a GPS-derived point P, that being the location of the locator device 12 in the one lead vehicle 32 at the respective job site. The landmark 34 is "dynamic" in the sense that it has a finite lifespan at any given location and, in effect, is "moved" or "relocated" to future job sites. Further, the system 24 in accordance with the system and method of the present invention is operable to distinguish the vehicles 30, 32 and dynamic landmarks 34 from other regular vehicles and landmarks. The difficulty that had previously existed was that locations of job sites regularly change and the information concerning the changing locations if made available ahead of time to the fleet management system 24 would require considerable increased record-keeping and administrative costs. Thus, it was desirable for the fleet management system 24 in order to provide a co-location report of supervisor visits to job sites to be able to avoid these increased burdens and not have to know the locations of job sites and to set up landmarks for the job sites in advance of the arrival of the lead vehicles 32 to the job sites. The fleet management system 24, in accordance with the system and method of the present invention, obviates a need to receive and store advance information of the location of the job sites by enabling the locator device 12 of each lead vehicle 32 to detect the change in the status of the vehicle 32, namely, the occurrence of the pre-defined event, such being detection by the locator device 12 of a pre-defined change in the status, such as shut-off of the ignition, of the lead vehicle 32. The system 24 through ongoing monitoring of the status of the one lead vehicle 32 via its locator device 12 is informed of and responds to the occurrence of the pre-defined event to create the dynamic landmark 34, presumably around a job site, as a result of the happening of the pre-defined event. Further, in accordance with the system and method of the present invention the fleet management system 24 through ongoing monitoring of the status of the supervisor vehicle 30 via its locator device 12 recognizes when a visit of the supervisor vehicle 30 is made to the work sites in view that the GPS-derived position information for the unique locator device 12 in the supervisor vehicle 30 is tracked and received by the system 24. The system 24 is configured to recognize entry and exit movements of the supervisor vehicle 30 during the visit as "in" and "out" events relative to the dynamic landmark 34. In other words, when the position of the locator device 12 in the moving supervisor vehicle 30 goes within the distance of the pre-defined radius R relative to the position P of the locator device 12 in the lead vehicle 32, the fleet management system 12 determines that an "in" event or beginning of a visit has occurred in which the supervisor vehicle 30 has crossed and entered the circular boundary C of the dynamic landmark 34 at the job site. The locator device 12 of the supervisor vehicle 30, in effect, leaves a geographical "foot print", indicating to the system 24 the occurrence of a dynamic landmark "in" event and thus the start of a visit by the supervisor vehicle 30 to the job site. When the position of the locator device 12 in the moving supervisor vehicle 30 goes more than the distance of the pre-defined radius R away from the position P of the locator device 12 in the lead vehicle 32 at the job site, such is recognized by the fleet management system 24 that a dynamic landmark "out" event relative to the circular boundary C of the dynamic landmark 34 and thus the exit and completion of a visit by the supervisor vehicle 30 to the job site has occurred. The start and completion times of the supervisor vehicle visit, and duration of the time between, the "in/out" events can be calculated by the system 24 and reported in the co-location report as the time spent by the supervisor vehicle 30 during the visit on the job site.

Additionally, the fleet management system 24 in accordance with the system and method of the present invention is adapted to provide a feature, such as a geofence 36, about an area of exclusion, for example, a parking lot for the fleet vehicles. Also, the system 24 is adapted to recognize a static landmark 38 with a pre-configured radius as another area of exclusion. When the locator devices 12 provides the system 24 with position and status (such as ignition shut-off) information regarding the vehicles 30, 32 indicating their presence in either area of exclusion.

Figure 3:
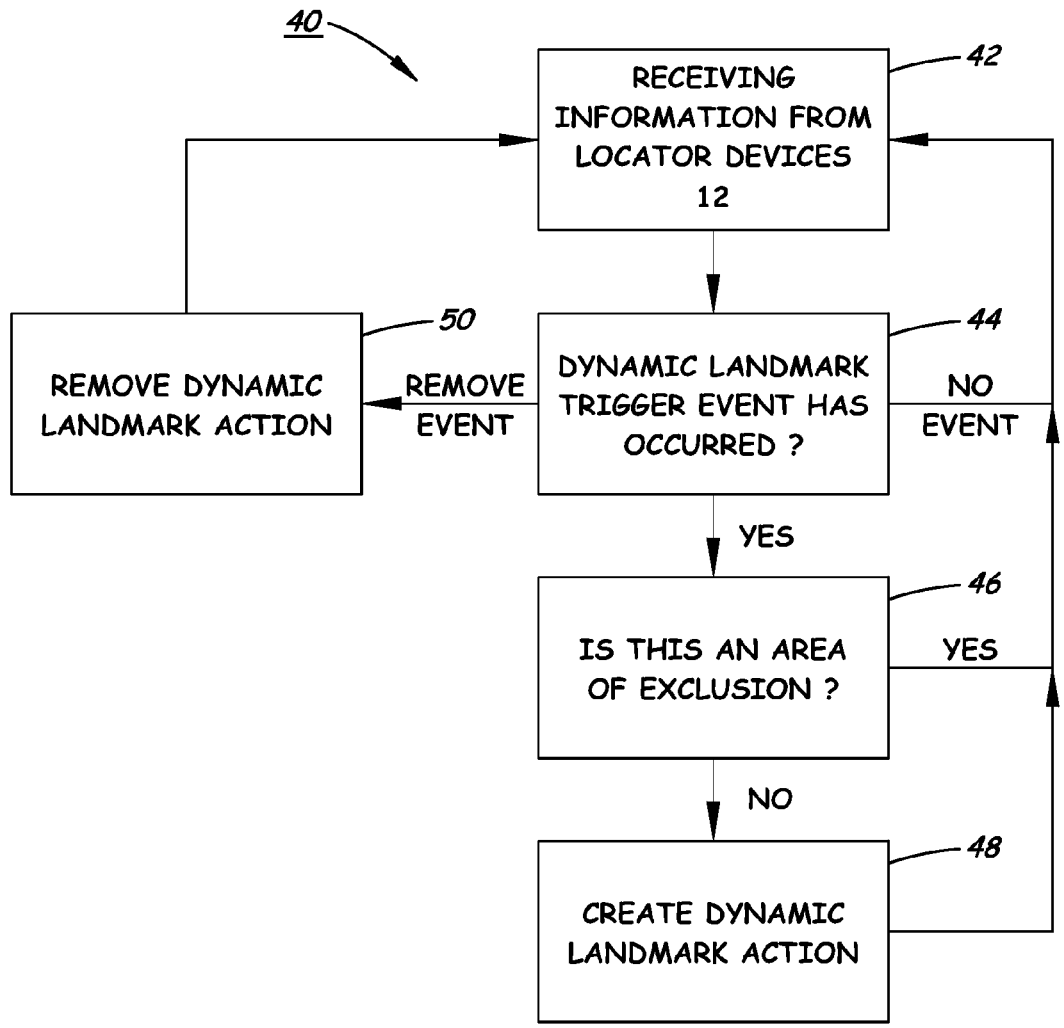
FIG. 3 is a flow diagram of a sequence of steps taken by the fleet management system in generating the co-location report in accordance with the system and method of the present invention.

Referring now to FIG. 3, there is illustrated a flow diagram 40 of an exemplary embodiment of a representative sequence of steps performed by the fleet management system 24 in generating a co-location report in accordance with the system and method of the present invention. Starting at step 42, the fleet management system 24 at least periodically (at successive short time intervals) monitors and samples the tracking devices 12 and wirelessly receives packets of information from each locator device 12 attached in one of the vehicles 30, 32. The packets of information contain current time, identification and location of the locator devices 12 and the status of the respective vehicle 30, 32. At decision step 44, a first packet of information is interrogated by the fleet management system 24 to decide whether the identification of the locator device 12 indicates that the locator device 12 is in a lead vehicle 32 and whether the status of the lead vehicle 32 indicates that a pre-defined trigger event, such as shut off of an ignition, has occurred. If the answer at decision step 44 is that a pre-defined Event has Triggered or occurred, then at decision step 46 the information is again interrogated by the fleet management system 24 to decide whether the location of the locator device 12 is within an area of exclusion. This is accomplished by the fleet management system 24 comparing the location of the locator device 12 with the locations of the areas of exclusion stored in the database 28. If the answer at decision step 46 is Yes that the location of the locator device 12 is within an area of exclusion, then the sequence reverts back to the starting step 42 where the next packet of information will be received and interrogated by the fleet management system 24 at decision step 44.

If the answer at decision step 46 is No that the location of the locator device 12 is not within an area of exclusion, then at decision step 48 a dynamic landmark is created. Once decision step 48 is complete the system will loop back to step 42 to continue monitoring the events. Any Supervisor vehicles passing through the dynamic landmark created at decision step 48, will generate an IN or OUT record that can be utilized to generate an In/out report later on.

Figure 4:
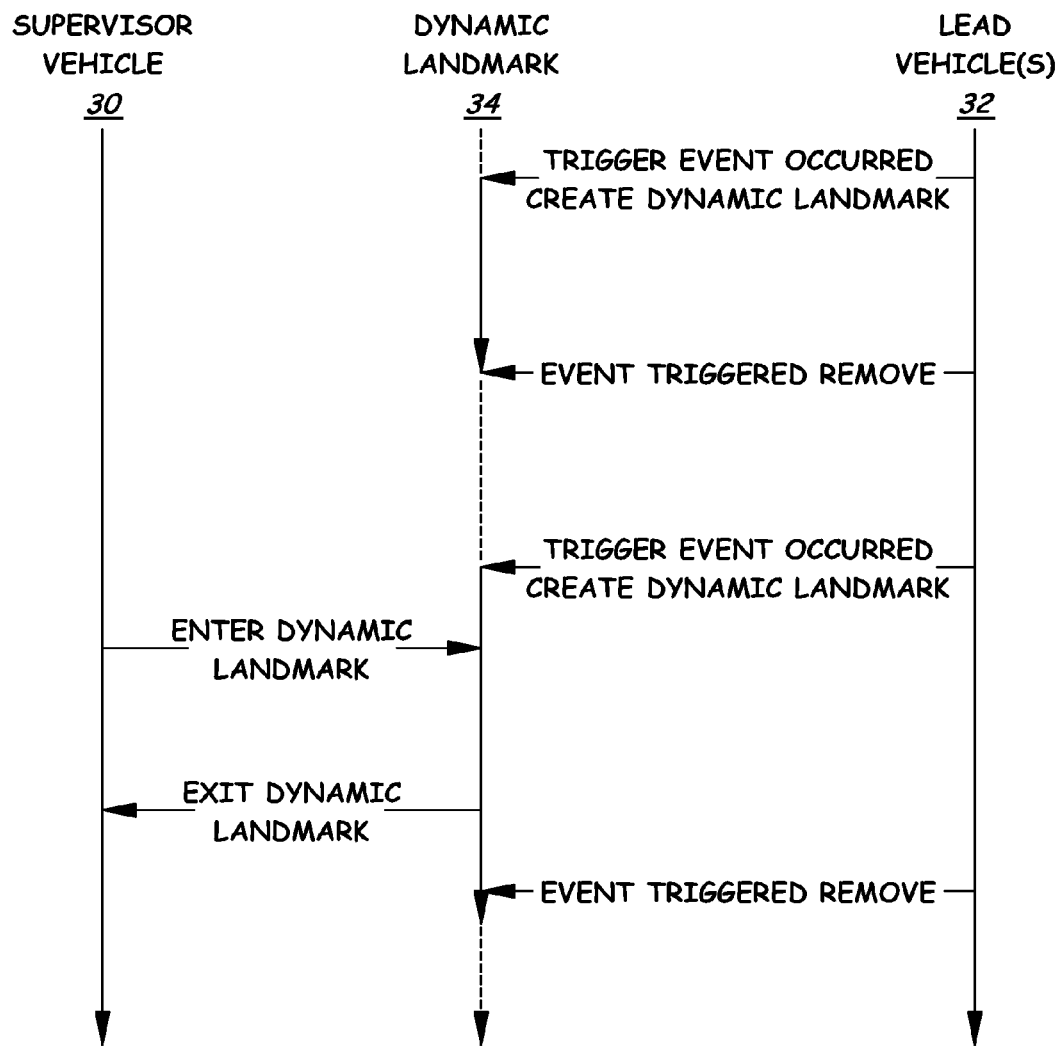
FIG. 4 is an events diagram providing timelines of sequences of events that may typically occur during the operation of the fleet management system in accordance with the system and method of the present invention.

Alternatively, if the answer at step 44 is that No Event triggered or occurred, then the sequence reverts back to the starting step 42 where the next packet of information will be received and interrogated by the fleet management system 24 at decision step 44. If the answer at step 44 is that a Remove Event occurred in view that the current time is such as to indicate that the time of the dynamic landmark 34 has expired, then at action step 50 the fleet management system 24 responds by noting the expiration of the dynamic landmark 34 in the database 28. Then, the sequence reverts back to the starting step 42 where the next packet of information will be received and interrogated by the fleet management system 24 at decision step 44. In FIG. 4 there is illustrated in a self-explanatory fashion an events diagram providing timelines of sequences of events that may typically occur during the operation of the system and method in accordance with the present invention.

Some advantages and benefits of the system and method of the present invention are: (1) reduction of computational resources required to calculate metrics pertaining to regulated supervisor vehicle visits to work crews in the field; (2) flexibility in selection of the event triggers that are used (such as lead vehicle stopping, telemetry events such as equipment activation, etc.); (3) use of a landmark with a certain set of fixed attributes that are uniform for all lead vehicles allowing businesses to standardize the measurement process, creating an objective means to measure that part of fleet performance; and (4) a reduction in the administrative costs of entering, managing and extracting co-location reports by collecting information automatically from the fleet management system without user intervention.

In the description herein, embodiments disclosing specific details have been set forth in order to provide a thorough understanding of the invention, and not to provide limitation. However, it will be clear to one having skill in the art that other embodiments according to the present teachings are possible that are within the scope of the invention disclosed. All parameters, dimensions, materials, and configurations described herein are examples only and actual values of such depend on the specific embodiment.

What is claimed is:

1. An event-triggered dynamic landmark creation system, comprising:
   a plurality of tracking devices, each of the tracking devices attached to one of a plurality of mobile objects and configured to wirelessly transmit information pertaining to the current time, the identification and location of the tracking device, and the status of the mobile object to which the tracking device is attached; and
   a management system configured to wirelessly communicate with each of the tracking devices and being operable to:
      receive the information from each of the tracking devices,
      in response to the received information concerning the occurrence of an initial event with respect to the status of a first of the mobile objects, create a non-physical dynamic landmark about the first mobile object relative to the location of a first of tracking devices attached thereto; and
      in response to the received information concerning the occurrence of successive subsequent events with respect to the location of a second of the tracking devices attached to a second of the mobile objects, record a visit of the second mobile object within the dynamic landmark about the location of the first mobile.

2. The system of claim 1 wherein the occurrence of the initial event is detection by the first tracking device is a pre-defined change of the status of the first mobile object.

3. The system of claim 1 wherein the occurrence of a first of the successive subsequent events is recognition by the management system of entry of the second mobile object to inside of the dynamic landmark about the first mobile object.

4. The system of claim 3 wherein the occurrence of a second of the successive subsequent events is recognition by the management system of exit of the second mobile object to outside of the dynamic landmark about the first mobile object.

5. The system of claim 4 wherein in response to the recognition of the entry and exit of the second mobile object to inside and outside of the dynamic landmark about the first mobile object, the management system is also operable to record the times of entry into and exit from the dynamic landmark and the duration of the visit.

6. The system of claim 5 wherein the management system is also operable to record the times and duration of the visit in a co-location report.

7. The system of claim 1 wherein in response to the creating the dynamic landmark about the location of the first mobile object, the management system is also operable to set a trigger event to remove the dynamic landmark the trigger event being either an elapsed time or a telemetry event.

8. The system of claim 1 wherein the management system is also operable to recognize the entry of the mobile objects into an area of exclusion with respect to which dynamic landmarks are not created.

9. The system of claim 8 wherein the area of exclusion is a static landmark.

10. The system of claim 8 wherein the area of exclusion is a geofence.

11. An event-triggered dynamic landmark creation method, comprising:
    wirelessly transmitting information pertaining to the current time, the identification and location of each of a plurality of tracking devices attached to one of a plurality of mobile objects, and the status of the mobile object to which one of the tracking devices is attached;

wirelessly receiving at a management system the information from each of the tracking devices;

in response to the received information concerning the occurrence of an initial event with respect to the status of a first of the mobile objects, creating a non-physical dynamic landmark about the first mobile object relative to the location of a first of tracking devices attached thereto; and in response to the received information concerning the occurrence of successive subsequent events with respect to the location of a second of the tracking devices attached to a second of the mobile objects, recording a visit of the second mobile object within the dynamic landmark about the location of the first mobile object.

12. The method of claim 11 wherein the occurrence of the initial event is the first tracking device detecting a pre-defined change of the status of the first mobile object.

13. The method of claim 11 wherein the occurrence of a first of the successive subsequent events is the management system recognizing the entry of the second mobile object to inside of the dynamic landmark about the first mobile object.

14. The method of claim 13 wherein the occurrence of a second of the successive subsequent events is the management system recognizing the exit of the second mobile object to outside of the dynamic landmark about the first mobile object.

15. The method of claim 14 wherein in response to recognizing the entry and exit of the second mobile object to inside and outside of the dynamic landmark about the first mobile object, recording by the management system the times of entry into and exit from the dynamic landmark and the duration of the visit.

16. The method of claim 15 further comprising recording by management system the times and duration of the visit in a co-location report.

17. The method of claim 11 wherein in response to creating the dynamic landmark about the location of the first mobile object, setting by the management system the capability of expiring the existence of the dynamic landmark by means of a trigger event being one of a vehicle movement or telemetry event.

18. The method of claim 11 further comprising recognizing by the management system the entry of the mobile objects into an area of exclusion with respect to which dynamic landmarks are not created.

19. The method of claim 18 wherein the area of exclusion is a static landmark.

20. The method of claim 18 wherein the area of exclusion is a geofence.

* * * * *